United States Patent [19]

Yamawaki et al.

[11] Patent Number: 5,030,506
[45] Date of Patent: Jul. 9, 1991

[54] POLYOLEFIN TYPE RESIN LAMINATE

[75] Inventors: Takashi Yamawaki, Ichihara; Komei Yamasaki, both of Ichihara, Japan

[73] Assignees: Idemitsu Petrochemical Company Ltd., Tokyo, Japan; Neste Oy, Espoo, Finland

[21] Appl. No.: 288,166

[22] Filed: Dec. 22, 1988

[30] Foreign Application Priority Data

Dec. 23, 1987 [JP] Japan .................................. 62-325665

[51] Int. Cl.$^5$ ................................................ B32B 7/02
[52] U.S. Cl. .................................... 428/216; 428/337; 428/349; 428/516; 526/348.1; 525/240
[58] Field of Search ............... 428/349, 516, 336, 216, 428/337; 526/348.1; 525/240

[56] References Cited

U.S. PATENT DOCUMENTS 4,726,999 2/1988 Kohyama et al. .................. 428/349

FOREIGN PATENT DOCUMENTS

| 50455 | 4/1982 | European Pat. Off. |
| 124310 | 11/1984 | European Pat. Off. |
| 137454 | 4/1985 | European Pat. Off. |
| 216509 | 4/1987 | European Pat. Off. |
| 54283 | 5/1978 | Japan .................................. 428/516 |
| 15950 | 1/1982 | Japan .................................. 428/516 |
| 61-110550 | 5/1986 | Japan. |

Primary Examiner—Edith Buffalow
Attorney, Agent, or Firm—Armstrong, Nikaido, Marmelstein, Kubovcik & Murray

[57] ABSTRACT

The present invention is directed to a polyolefin type resin laminate that comprises a base layer made of a polyolefin type resin consisting mainly of butene-1 type polymer in which the content of other α-olefin unit of 15 mol % or below, the intrinsic viscosity [η] is 1.2 to 4.0 dl/g, the ratio Mw/Mn of the weight-average molecular weight [Mw] to the number-average molecular weight [Mn] is from 2 to 10, and the haze is 50% or below, and layers each provided on each of the opposite surfaces of said base layer and made of a polyolefin type resin having a melt index [MI] of 0.1 to 30 g/10 min, the haze of each of the latter layers being up to that of said base layer, characterized in that the haze of said laminate is 3% or below, the strain recovery rate is 90% or over and the ratio of the tear strength in the M. D. to the tear strngth in the T. D. is from 0.25 to 4.

9 Claims, No Drawings

POLYOLEFIN TYPE RESIN LAMINATE

BACKGROUND OF THE INVENTION

1. Field of the Invention

The present invention relates to a novel polyolefin type resin laminate. More particularly, the present invention relates to an excellent polyolefin type resin laminate that is suitable as a stretch film for packaging food, causes no public hazards, is nontoxic, and would neither deteriorate the packaged state nor lower the commercial value of an article when the article packaged in the laminate.

2 Description of the Related Art

Recently, stretch-wrap packages are used widely because, for example, stretch-wrap packages have such features that (a) the stretch film can fit the profile of an article to be packaged without forming crumples, so that the commercial value of the appearance of the article to be packaged is increased, (b) the stretch film has a moderate gas permeability so that it can prevent the freshness of an article to be packaged such as perishable foods from lowering, and (c) efficient packaging operation can be done by using an automatic packaging machine.

The following, for example, are required for stretch films to be used in such stretch-wrap packages: a stretch film (1) should be excellent in deformation recovery property, i.e., should be high in strain recovery rate, (2) should be excellent in transparency, (3) should be excellent in fog resistance, (4) should be high in breaking extension, (5) should have a moderate gas permeability and should be low in water vapor permeability, (6) should not allow the components in the film to transfer to the food in the package, (7) should not bring about problems when it is treated as waste, and (8) can withstand cold storage and cold transportation.

Conventionally, as such stretch film, use has been made of a non-stretched film usually consisting of a soft vinyl chloride resin.

However, in the case of such soft vinyl chloride resin films, although, of the above requirements, items under (1), (2) and (4) are relatively satisfied, soft vinyl chloride resin films have, for example, such defects that (a) since the soft vinyl chloride resin film contains a large amount of a plasticizer, it is liable to cause blooming, and it is liable to transfer to the article that is packaged in the film, which is not preferable in view of food hygiene (the requirements under (3) and (6) mentioned above are not satisfied), (b) when the film is fused or burnt, it re)eases hydrogen chloride gas, which is not preferable in view of environmental hygiene (the requirement under (7) mentioned above is not satisfied), (c) when an article packaged therein is refrigerated and stored or transported, the film becomes brittle and liable to be broken (the requirement under (8) mentioned above is not satisfied), and (d) the water vapor permeability of the film is high, and the film is not suitable for packaging some types of perishable foods (the requirement under (5) mentioned above is not satisfied).

To obviate the defects of such a stretch film made of a soft vinyl chloride resin, a film made of a polyolefin type resin is suggested.

However, this film is inferior in deformation recovery property. That is, for example, when the film is pressed by one's finger, necking occurs, and the film is deformed and is hardly restored to the original shape. In the case wherein an article packaged in a film made of a polyolefin type resin is displayed on a shop front to allow consumers to watch it by freely handling it, if the article is handled many times by consumers to watch it, the state of the package becomes worsened, leading to lowering of the value of the article packaged in said film. Therefore, because the film of a polyolefin type resin has such a defect that it cannot be used in a field in packaging food wherein it is required that the packaged state would not be worsened if the package is handled many times, the field wherein the film of a polyolefin type resin is used is inevitably restricted.

On the other hand, as polyolefin type resins, butene-1 type polymers such as a butene-1 homopolymer and a copolymer of butene-1 with other α-olefin are known, and these butene-1 type polymers are used mainly to improve the heat-sealing properties of polypropylenes (Japanese Patent Application Laid-Open No. 110550/1986), but it is the present state that the application of them wherein their characteristics can be utilized to the maximum has not yet been developed fully.

SUMMARY OF THE INVENTION

The present invention has been made in order to provide a polyolefin type resin laminate particularly suitable for a stretch film for packaging food, which polyolefin resin laminate has, for example, such properties that it can overcome the defects incidental to conventional soft vinyl chloride film, is excellent in transparency, fog resistance, tear strength, and low-temperature resistance, has a moderate gas permeability, is low in water vapor permeability, will not allow the plasticizer to transfer, will not release hydrogen chloride gas when it is burnt, is good in deformation recovery property, and has a feature that the state of the package formed by the laminate will not become worsened so that the commercial value of the article in the package will not be lowered.

The inventors have made intensive studies to develop a polyolefin type resin laminate having the above-mentioned preferable properties, and have found that when, for a base layer, use is made of a polyolefin type resin mainly consisting of a specified butene-1 type polymer, and a layer made of a specified polyolefin is provided on each of the opposite surfaces of the base layer to form a laminate having prescribed physical properties, the laminate meets the above object, leading to the completion of the present invention.

Therefore, the present invention provides a polyolefin resin laminate that comprises a base layer made of a polyolefin type resin consisting mainly of butene-1 type polymer in which the content of other α-olefin unit of 15 mol % or below, the intrinsic viscosity [η] is 1.2 to 4.0 dl/g, the ratio Mw/Mn of the weight-average molecular weight [Mw] to the number-average molecular weight [Mn] is from 2 to 10, and the haze is 50% or below, and layers each provided on each of the opposite surfaces of said base layer and made of a polyolefin type resin having a melt index [MI] of 0.1 to 30 g/10 min, the haze of each of the latter layers being up to that of said base layer, characterized in that the haze of said laminate is 3% or below, the strain recovery rate is 90% or over and the ratio of the tear strength in the M. D. (machine direction) to the tear strength in the T. D. (transverse direction) is from 0.25 to 4.

DESCRIPTION OF THE PREFERRED EMBODIMENTS

In the present laminate, for the base layer, use is made of a polyolefin type resin mainly consisting of a butene-1 type polymer.

The butene-1 type polymer may be a homopolymer of butene-1 or a copolymer of butene-1 with other α-olefin. In the case of such a copolymer, it is necessary that the content of the α-olefin unit is 15 mol % or below. If this content exceeds 15 mol %, the tensile modulus of the laminate lowers remarkably and the laminate becomes unpreferable as a stretch film for packaging food.

As α-olefins to be copolymerized with butene-1 can be mentioned for example ethylene, propylene, pentene-1, and hexene-1, which may be used alone or in combination.

It is required that the butene-1 copolymer has an intrinsic viscosity $[\eta]$ in the range of 1.2 to 4.0 dl/g, preferably 1.5 to 3.0 dl/g, measured in a decalin solution at a temperature of 135° C.

If the $[\eta]$ is less than 1.2 dl/g, the strength of the butene-1 type polymer is so low that it is difficult to stretch it, and therefore the butene-1 type polymer cannot be used for a laminate of the present invention, while if the $[\eta]$ exceeds 4.0 dl/g, stretching the butene-1 type polymer becomes difficult, and if the stretching of the butene-1 type polymer is daringly carried out, the surface of the base layer becomes undulated, and a fine raw laminate cannot be obtained.

Further, it is necessary that the ratio Mw/Mn of the weight-average molecular weight [Mw] of said butene-1 type polymer to the number-average molecular weight [Mn] thereof is from 2 to 10, preferably from 3 to 8, and the haze of said butene-1 type polymer is 50% or below, preferably 40% or below. When the value of the Mw/Mn that indicates the molecular weight distribution is less than 2, the flowability of the butene-1 copolymer lowers, and similarly to the case where the $[\eta]$ is larger than 4.0 dl/g, the base layer surface is liable to undulate, while if the value of the Mw/Mn exceeds 10, the strength of the base layer lowers and the necking resistance characteristic of the butene-1 type polymer is apt to lower. When the haze exceeds 50%, the transparency of the laminate lowers.

As preferable butene-1 type polymers can be mentioned, for example, copolymers that contain ethylene units and butene-1 units in a molar proportion of from 1 : 99 to 15 : 85 and satisfy the above conditions. When the copolymer is analyzed by using a differential scanning calorimetric analyzer, two types of endothermic peaks indicating the lowest melting point and the highest melting point are obtained, and the highest melting point usually falls within the range of 70° to 120° C. With respect to the above copolymer, it is desirable that the difference between the highest melting point and the lowest melting point is in the range of 2° to 40° C. If this temperature difference is less than 2° C., the heat sealing properties of the laminate are poor, while if this temperature difference exceeds 40° C., it is unpreferable because the copolymer becomes viscous, and the molding performance is inclined to lower.

Further, it is preferable that the amount of the heat of fusion of the copolymer measured by the above differential scanning calorimetric analysis (that is determined by the straight line connecting the base lines of the peak or the shoulder appeared in the differential scanning calorimetric analysis) is in the range of 2 to 25 cal/g. If the amount of the heat of fusion is lower than 2 cal/g, the copolymer sometimes becomes sticky, while if the amount of the heat of fusion is higher than 25 cal/g, it is unpreferable because the transparency of the laminate is inclined to lower.

Further, it is desirable that the ethylene block property of the copolymer measured by $^{13}$C-NMR is 0.015 or below. The ethylene block property, by utilizing the method described in "Macromolecules", Vol. 15, page 353 (1982) to identify triads from the results measured by the $^{13}$C-NMR, can be expressed in terms of the formula:

$$X = I/E$$

wherein I is the block polymerization proportion of the ethylene chain in the copolymer and can be expressed usually by the formula:

$$I = \frac{I_{EEE}}{I_{BBE} + I_{EBE} + I_{BEB}}$$

and E is the content of the ethylene unit in the copolymer and can be expressed usually by the formula:

$$E \text{ (mol \%)} = \frac{I_{EEE}/2 + I_{EBE} + I_{EEB}}{I_{BBB} + I_{BBE} + I_{BEB} + I_{EEE}/2 + I_{EBE} + I_{EEB}} \times 100$$

and for example, $I_{EEE}$ is defined as the number of mols of the ethylene unit/ethylene unit/ethylene unit present in the butene-1 copolymer, and in the same way, $I_{BEE}$, $I_{EBE}$, $I_{BEB}$ and so on can be defined, by assuming the three monomer units in the copolymer as one unit, to represent the types of the units respectively.

It is desirable that the ethylene block property (X) thus expressed is 0.015 or below, and since it is better that the value thereof is lower, the most preferable value is 0. That is, when considering three monomer units in the copolymer, the more higher the number of repeating units all of which are ethylene units is, the more higher the crystallinity of the copolymer is. Therefore, when the block property (X) of ethylene is higher than 0.015, the transparency of the laminate lowers.

Further, it is desirable that the boiling diethyl ether soluble content in the butene-1 copolymer is in the range of 3 to 25 wt. %. Generally, the solubility of the copolymer in boiling diethyl ether is inclined to lower as the degree of polymerization of the copolymer increases, and that solubility is inclined to lower as the crystallinity increases. Controlling the boiling diethyl ether soluble content of the copolymer to fall in the above range means that components having a lower degree of polymerization in the copolymer and the crystallinity of the copolymer are restricted.

Therefore, if the boiling diethyl ether soluble content is lower than 3 wt. %, the transparency of the laminate is apt to lower, while if the boiling diethyl ether soluble content is higher than 25 wt. %, a sticky state will probably occur because the content of components having a lower degree of polymerization increases.

The butene-1 copolymer can be easily produced, for example, by subjecting butene-1 and ethylene to gas phase polymerization in the presence of a catalyst comprising a solid catalyst (A), an organic aluminum compound (B), and an electron donative compound (C). The solid catalyst component (A) can be prepared by chlorinating at least one of organic magnesium compounds represented by the general formula:

$MgR^1R^2$ wherein $R^1$ and $R^2$, which may be the same or different, each represent an alkyl group having 1 to 20 carbon atoms, with a chlorinating agent to obtain a carrier, and then by contacting the carrier with a titanium(IV) halide at a temperature ranging from $-25°$ to $180°$ C. in the presence of an electron donor.

As the organic magnesium compounds can be mentioned alkylmagnesium compounds such as diethylmagnesium, ethylbutylmagnesium, ethylhexylmagnesium, ethyloctylmagnesium, dibutylmagnesium, butylhexylmagnesium, butyloctylmagnesium, and dicyclohexylmagnesium.

As the chlorinating agent can be mentioned chlorine gas and alkyl chlorides, and preferably a combination of chlorine gas and butyl chloride is used as the chlorinating agent. The chlorination is usually carried out at a temperature ranging from 0° to 100° C., preferably from 20° to 60° C., and more preferably 20 to 40° C.

Since, by the chlorination, part of the alkyl groups bonded to the magnesium atom is replaced with chlorine atoms, and at least part of the alkyl group remains, formation of the normal crystal lattice is obstructed by the action of the remaining alkyl group, and a non-layer product having a suitable surface area, a suitable pore volume and a very fine crystal diameter is formed.

The thus obtained non-layer product is, if required, subjected to an alcohol treatment, and is treated with a titanium(IV) halide in the presence of an electron donor. The treatment with a titanium(IV) halide is generally carried out at a temperature ranging from $-25°$ to $180°$ C.

As the titanium(IV) halide can be mentioned, for example, titanium tetrahalides, alkoxytitanium trihalides, alkoxytitanium dihalides, and trialkoxytitanium monohalides, and particularly preferably titanium tetrachloride is used.

As the electron donor, use can be made of organic compounds containing oxygen, nitrogen, phosphorus, or sulfur.

As specific examples of the electron donor can be mentioned amines, amides, ketones, nitriles, phosphines, phosphoamides, esters, ethers, thioethers, thioesters, acid anhydrides, acid halides, acid amides, aldehydes, organic acids, and esters.

Of these, preferable ones are esters, ethers, ketones, and acid anhydrides, and specific examples of such compounds are benzoic acid, p-methoxybenzoic acid, p-ethoxybenzoic acid, toluic acid, diisobutyl phthalate, benzoquinone, and benzoic anhydride.

It is desirable that the thus prepared solid catalyst component has a halogen/titanium molar ratio in the range of from 3 to 200, preferably from 4 to 100, and a magnesium/titanium molar ratio in the range of from 1 to 90, preferably from 5 to 70.

Although there is no particular limit on the organic aluminum compound (B) in the catalyst, generally a trialkylaluminum is preferably used.

As the electron donative compound (C) can be used a heterocyclic compound represented by the general formula:

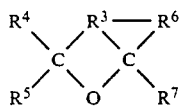

wherein $R^3$ and $R^6$ each represent a hydrocarbon group, preferably a substituted or unsubstituted and saturated or unsaturated hydrocarbon group having 2 to 5 carbon atoms, and $R^4$, $R^5$ and $R^7$ each represent a hydrogen atom or a hydrocarbon group, preferably a hydrogen atom or a substituted or unsubstituted and saturated or unsaturated hydrocarbon group having 1 to 5 carbon atoms.

As the heterocyclic compound can be mentioned, for example, 1,4-cineole, 1,8-cineole, m-cineole, pinol, benzofuran, 2,3-dihydrobenzofuran (coumaran), 2H-chromene, 4H-chromene, chroman, isochroman, dibenzofuran, and xanthene, which may be used alone or in combination.

Of these heterocyclic compounds, 1.8-cineole is particularly preferable.

With respect to the composition of the catalyst used in producing the butene-1 copolymer, it is desirable that the molar quantity of the organic aluminum compound (B) is generally from 0.1 to 1000 times, preferably 1 to 500 times, for the titanium atom in the titanium(IV) compound in the solid catalyst component (A), and it is desirable that the molar quantity of the electron donative compound (C) is generally from 0.1 to 500 times, preferably 0.5 to 200 times, for the titanium atom of the titanium(IV) compound in the solid catalyst component (A).

The gas phase polymerization temperature is generally selected in the range of 45° to 80° C., preferably in the range of 50° to 70° C., and the polymerization pressure can be set in the range where liquefaction of the raw material components would not substantially take place, and generally is in the range of 1 to 15 kg/cm².

Further, the molar ratio of ethylene and butene-1 to be introduced can be set suitably in the range of the molar ratio of ethylene and butene-1 in the copolymer to be obtained, that is, in the range of from 1 : 99 to 15 : 85.

Further, for the purpose of adjusting the molecular weight, a molecular weight modifier such as hydrogen may be additionally present, and for the purpose of preventing the copolymer from flocculating, an inert gas whose boiling point is lower than that of butene-1 such as nitrogen, methane, ethane, and propane may also be present.

For the base layer of the laminate according to the present invention, only a butene-1 type polymer may be used or if required a mixture of a butene-1 type polymer and other polyolefin type resin may be used. In the latter case, the amount of the other polyolefin type resin to be used is 100 pts. wt. or below for 100 pts. wt. of the butene-1 type polymer. As this polyolefin type resin can be used for example a low-density polyethylene, a linear low-density polyethylene, a high-density polyethylene, an ethylene/vinyl acetate copolymer, and a polypropylene.

The laminate according to the present invention is one having layers of a polyolefin type resin on the opposite surfaces of the base layer. As the polyolefin type resin, preferably use is made of one having a melt index [MI] in the range of 0.1 to 30 g/10 min, preferably in the range of 0.3 to 15 g/10 min. If the [MI] is less than 0.1 g/10 min, the surface becomes rough and the transparency lowers, while if the [MI] exceeds 30 g/10 min, the moldability becomes poor. It is required that the haze of this surface layer is up to that of the haze of the base layer, and if the haze of the surface layer is higher than the haze of the base layer, it is difficult to bring the haze of the laminate lower than 3% or below.

As the polyolefin type resin used in the surface layer can be mentioned a low crystalline to high crystalline resin that will be obtained by polymerizing mainly olefins having 2 to 4 carbon atoms, and, for example, a low-density polyethylene, a linear low-density polyethylene, a high-density polyethylene, a polypropylene, a crystalline polybutene-1, an ethylene/vinyl acetate copolymer can be used.

With respect to the thickness of the base layer and the surface layer of the laminate according to the present invention, the thickness of the base layer is selected generally in the range of 7 to 45 μm, preferably in the range of 8 to 40 μm, and it is desirable the ratio of the thickness of the base layer to the thickness of the surface layer is preferably in the range of from 0.5 to 20, more preferably in the range of from 1 to 10. When the thicknesses of the base layer and the surface layer are in such ranges, the strength of the laminate can be secured sufficiently and at the same time also the characteristics of the butene-1 type polymer can be fully exhibited.

It is required that the haze of the laminate according to the present invention is 3% or below. If that haze exceeds 3% the article packaged in the laminate cannot seen clearly, and therefore if an article is packaged in a laminate having a haze exceeding 3%, the commercial value of the article is lowered. It is also required that the strain recovery rate is 90% or over, and if a laminate having a strain recovery rate of less than 90% is used as a stretch film for packaging food, the part where one's hand has touched remains stretched and cannot restore its original shape, which lowers remarkably the commercial value of the packaged article. Further it is required that the ratio of the tear strength in the M. D. to the tear strength in the T. D. is in the range of from 0.25 to 4. If this tear strength ratio falls outside the abovementioned range, the laminate is liable to be torn.

There is no particular limitation with respect to the method of producing the laminate of the present invention, and although any one of processes conventionally used in the production of laminated films can be selected to be used for the production of the laminate of the present invention, generally a method can be used wherein hot melt films are laid by an extruder using the extrusion laminate process, and then cooled to be solidified, and the laminate is monoaxially or biaxially stretched.

The present polyolefin type resin laminate is particularly suitable for a stretch film for packaging food, which olefin resin laminate has, for example, such properties that it is excellent in transparency, fog resistance, tear strength, and low-temperature resistance, has a moderate gas permeability, is low in water vapor permeability, will neither allow the plasticizer to transfer, nor release hydrogen chloride gas when it is burnt (which means that the laminate results in no problems in view of food hygiene and environmental hygiene), and is good in deformation recovery property. Therefore, when an article is packaged in the present polyolefin type resin laminate, the commercial value of the article in the package will not be lowered.

EXAMPLES

The present invention will now be further described in detail with reference to the following Examples, which are not meant to limit the invention.

Physical properties were determined as follows:

(1) The intrinsic viscosity [η] of polybutene-1
Measured in decalin at 135° C.

(2) The molecular weight distribution (Mw/Mn) of polybutene-1
Measured at a temperature 135° C. with two Showdex AD 807 and two AD 80M/S mounted to a GCP apparatus 150° C. manufactured by Waters Co.

(3) The haze
Measured in accordance with ASTM-D-1003.

(4) The fog resistance of the laminate
The laminate was placed on a 200-ml beaker containing 100 ml of water at 20° C., then after it was permitted to stand in a constant temperature bath for 10 min at 5° C., it was taken out, and the state of the surface of the laminate was judged visually in accordance with the below mentioned standards to determine the fog resistance.

O: There were no water droplets on the surface.
Δ: There were water droplets partially on the surface.
X: There were water droplets all over the surface.

(5) The tensile modulus (in the M. D., and T. D.) of the laminate
The modulus was determined at an extension of 5% measured in accordance with ASTM D-822-67.

(6) The strain recovery rate of the laminate
The film was set to a sample jig with the film firmly spread. On the other hand, a semispherical jig having a diameter of 80 mm was set on the load cell side of a tensile machine, and the semispherical jig was moved at a rate of 100 mm/min to 20 mm below the film surface. After that state was maintained for 10 sec, the jig was lifted to release the stress.

The displacement of the film was read by using a magnifier. The strain recovery rate is defined by the following formula:

$$\frac{20 - X}{20} \times 100\%$$

wherein X represents the displacement in mm of the film after the test.

(7) The adhesion of the laminate
The surfaces of two sample films each having a width of 10 mm and lined with an adhesive tape were stuck together by applying a finger pressure onto an area of 3 cm$^2$, the stuck films were pulled at a rate of 200 mm/min by using a tensile machine to measure the shearing force required to separate the stuck surfaces, and it was expressed in terms of a value per 1 cm$^2$ of the stuck area.

(8) The rate of tear strength (MD/TD)
Tear strength in the M.D. and T.D. was measured in accordance with ASTM D-1922-78.

PREPARATION EXAMPLES

Preparation of Polybutene-1

(1) Preparation of Solid Catalyst Component (A)
300 ml of butyloctylmagnesium (20% heptane solution) were charged into a five-necked flask with a mechanic stirrer, a reflux condenser, a dropping funnel, a gas supply valve, and a thermometer, nitrogen was introduced into the flask so that the inside of the flask was kept in an inert atmosphere, and then 5 l of butyl chloride were added via the dropping funnel at room temperature. Thereafter, chlorine gas was added at a rate of 5 ml/min to carry out the chlorination.

Then, 2.5 l of silicone oil were added at 25° to 35° C. and then 113 ml of ethanol were added dropwise to the mixture. The chlorinated product formed was precipitated by the addition of ethanol. After the mixed solution containing the precipitate was stirred at 40° C. for 1 hour, the temperature was elevated to 75° to 80° C., and the solution was allowed to stand at that temperature overnight.

The high temperature solution was added gently through a siphon to a solution cooled to −25° C. containing diisobutyl phthalate (electron donor) and excess $TiCl_4$ so that the reaction intermediate was allowed to precipitate in the low temperature $TiCl_4$. Then, the temperature of the mixed solution containing the precipitate was raised to room temperature.

Then, further diisobutyl phthalate as electron donor was added to the mixed solution containing the precipitate, the temperature was raised to 100° to 110° C., and the mixed solution was kept at that temperature for 1 hour. The reaction product was allowed to settle, and was washed with heptane 5 to 6 times at 85° C., and the mixed solution containing the precipitate was transferred to other container via a siphon.

Further, excess $TiCl_4$ was added to that mixed solution, and the mixture was stirred for 1 hour at 110° C. The produced settlings and the solution were separated by a siphon, and the thus produced catalyst component (settlings) was washed with heptane 5 to 6 times at 80° C.

The obtained settlings are collected, and were dried under slightly reduced pressure. Thus, a solid catalyst component (A) having a Ti content of 3.0 wt. % was obtained.

(2) Preparation of the Catalyst

The solid catalyst component (A) obtained in (1) above was charged into a catalyst preparing tank so that the titanium concentration might become 2 millimols in 1 liter. Then, triisobutylaluminum in an amount of 10 millimols/l, and 1,8-cineole in an amount of 4 millimols/l were added to the catalyst preparing tank. Thereafter, propylene was added in such an amount of 50 g per 1 millimol of titanium atoms, the inside temperature of the catalyst preparing tank was raised to 40° C., and the reaction for the preparation of a catalyst was carried out for 15 min. Thereafter, the reaction product was filtered, and then dried to obtain the intended catalyst.

(3) Preparation of Butene-1 Copolymers

A fluidized bed polymerization vessel with a diameter of 300 mm and a capacity of 100 l was used, and the catalyst obtained in (2) above was fed to the polymerization vessel at a feed rate of 0.3 millimol/hour in terms of Ti atoms, and triisobutylaluminum and 1,8-cineole were fed to the polymerization vessel at a flow rate of 30 millimol/hour, and at a flow rate of 24 millimol/hour respectively.

Butene-1, ethylene, hydrogen and nitrogen gas were fed thereto in such a manner that the partial pressure of butene-1 and the partial pressure of nitrogen were adjusted to 3 kg/cm², and 4 kg/cm², respectively, and the gas superficial velocity in the column was 35 cm/sec, and the polymerization was performed at a reaction temperature of 60° C.

Thus, a butene-1 copolymer containing 1.6 mol % of the ethylene unit was prepared. As a result of the measurement by a differential scanning calorimetric analyzer, the highest melting point of the butene-1 copolymer was 92° C., the lowest melting point thereof was 78° C., the amount of the heat of fusion thereof was 12 cal/g, the ethylene block property measured by $^{13}C$-NMR was 0 and the boiling diethyl ether soluble content was 15 wt. %.

In the similar manner, butene-1 monopolymer and a butene-1 copolymer containing 18 mol % of the hexene-1 unit were prepared.

As a result of the measurement by the differential scanning calorimetric analyzer, the highest melting point of the butene-1 monopolymer was 113° C., and the lowest melting point thereof was 93° C. As a result of the measurement by the differential scanning calorimetric analyzer, the highest melting point of the butene-1 copolymer containing 18 mol % of the hexene-1 unit was 68° C., and the lowest melting point thereof was 64° C.

The limiting viscosity [η], the haze, and the Mw/Mn of these polymers are shown in Table 1.

EXAMPLES 1 TO 6 AND COMPARATIVE EXAMPLES 1 TO 6

Using a three-layer die having a slit of 1.5 mm and a diameter of 50 mm and attached to the tip of two extruders having a diameter of 45 mm and a diameter of 30 mm respectively, each tubular film was formed by adjusting the extrusion rates so that the thickness of each layer might become as shown in Table 1. The extruder was adjusted such that in the case of the polybutene-1, the resin temperature was set at 180° C., in the case of the LL (linear low-density polyethylene), it was set at 200°, and in the case of the PP (polypropylene), it was set at 230° C.

Then, after the tubular film was cooled and solidified, the film was heated to 110° C., and stretching was effected in such a manner that the draw ratios in the M. D. and T. D. might be as shown in Table. The obtained film was trimmed by slitting to form separate two films, and the resulting films are taken up into the shape of rolls.

The physical properties of the laminates thus obtained are shown in Table 1.

PP used was made by Idemitsu Petrochemical Co., Ltd. and had an MI of 10 g/10 min (F 730 N), and LL used was made by Idemitsu Petrochemical Co., Ltd. and had an MI of 1 g/10 min (0128 N). In the PP and LL used for the surface layer, sorbitan laurate as nonionic surface active agent and a mineral oil having a specific gravity of 0.870 and a viscosity of 250 (Saybolt seconds, 38° C.) were contained in amounts of 1.2 wt. % and 3.0 wt. %, respectively.

In Example 5, a polyolefin type resin consisting of 70 wt. % of polybutene-1 and 30 wt. % of PP was used.

TABLE 1

| | | | Example | | | | | |
|---|---|---|---|---|---|---|---|---|
| | | Unit | 1 | 2 | 3 | 4 | 5 | 6 |
| Raw | Constitution | — | PP/PB-1 | PP/PB-1 | PP/PB-1 | LL/PB-1 | PP/PB-1 | PP/PB-1 |

TABLE 1-continued

| laminate | | | /PP | /PP | /PP | /LL | +PP/PP | /PP |
|---|---|---|---|---|---|---|---|---|
| | Thickness | μm | 15/105/15 | 15/105/15 | 30/75/30 | 15/105/15 | 15/105/15 | 15/105/15 |
| Draw ratio (MD,TD) | | — | 3 × 3 | 3 × 3 | 3 × 3 | 3 × 3 | 3 × 3 | 2.3 × 2.3 |
| Thickness of product | | μm | 15 | 15 | 15 | 15 | 15 | 25 |
| Polybutene -1 | [η] | dl/g | 1.95 | 2.45 | 1.95 | 1.95 | 1.95 | 1.95 |
| | Haze | % | 25 | 31 | 26 | 26 | 26 | 25 |
| | Mw/Mn | — | 5.6 | 6.7 | 5.6 | 5.6 | 5.6 | 5.6 |
| | Comonomer | — | ethylene | — | ethylene | ethylene | ethylene | ethylene |
| | Comonomer content | mol % | 1.5 | 0 | 1.6 | 1.6 | 1.6 | 1.5 |
| Haze of base layer* | | % | 25 | 31 | 26 | 25 | 15 | 25 |
| Haze of surface layer* | | % | 4 | 4 | 4 | 10 | 4 | 4 |
| Physical properties of laminate | Tensile modulus (MD) | kg/cm$^2$ | 2800 | 3200 | 3100 | 2600 | 3500 | 2900 |
| | Tentional modulus (TD) | kg/cm$^2$ | 2700 | 2900 | 3000 | 2400 | 3200 | 2700 |
| | Haze | % | 0.8 | 1.2 | 0.7 | 1.2 | 0.5 | 1.5 |
| | Strain recovery rate | % | 99 | 99 | 98 | 99 | 97 | 98 |
| | Rate of the tear strength (MD/TD) | — | 0.8 | 0.7 | 0.9 | 0.85 | 0.9 | 0.8 |
| | Fog resistance | — | ○ | ○ | ○ | ○ | ○ | ○ |
| | Adhesion | kg/cm$^2$ | 0.75 | 0.68 | 0.72 | 0.73 | 0.74 | 0.82 |

| | | | Comparative Example | | | | | |
|---|---|---|---|---|---|---|---|---|
| | | | 1 | 2 | 3 | 4 | 5 | 6 |
| Raw laminate | Constitution | | LL/PB-1/PP | PP/PB-1/PP | PP/PB-1/PP | PP/PB-1/PP | LL | PP |
| | Thickness | | 15/105/15 | 15/105/15 | 15/105/15 | 15/105/15 | 15 | 135 |
| Draw ratio (MD,TD) | | | 1.6 × 1.6 | 3 × 3 | 3 × 3 | 3 × 3 | — | 3 × 3 |
| Thickness of product | | | 50 | 15 | 15 | 15 | 15 | 15 |
| Polybutene -1 | [η] | | 1.95 | 0.8 | 4.2 | 2.1 | — | — |
| | Haze | | 26 | — | — | 21 | — | — |
| | Mw/Mn | | 5.6 | 5.8 | 5.4 | 5.2 | — | — |
| | Comonomer | | ethylene | — | — | hexene −1 | — | — |
| | Comonomer content | | 1.6 | 0 | 0 | 18 | — | — |
| Haze of base layer* | | | 26 | Homogeneous film could not be formed because of defective molding | | 21 | 10 | 4 |
| Haze of surface layer* | | | 10 | | | 4 | — | — |
| Physical properties of laminate | Tensile modulus (MD) | | 2500 | | | 1200 | 2800 | 5500 |
| | Tentional modulus (TD) | | 2300 | | | 900 | 2700 | 5300 |
| | Haze | | 3.5 | | | 0.9 | 1.0 | 0.7 |
| | Strain recovery rate | | 99 | | | 92 | 87 | 84 |
| | Rate of the tear strength (MD/TD) | | 0.75 | | | 0.8 | 0.3 | 0.9 |
| | Fog resistance | | ○ | | | Δ | ○ | Δ |
| | Adhesion | | 0.71 | | | 0.92 | 0.74 | 0.67 |

*Haze : The haze of the base layer and the haze of the surface layer were those obtained by forming the base layer material and the surface layer material into films having a thickness of 30 μm and measuring their haze.

We claim:

1. A polyolefin resin laminate comprising a base layer and layers provided on each surface of the base layer,
   wherein the base layer consists essentially of 70–100% by weight of a butene-1 polymer or of a butene-1-α-olefin copolymer wherein the content of the α-olefin is 15 mol % or below, said copolymer having an intrinsic viscosity [η] of 1.2 to 4.0 dl/g, a ratio Mw/Mn of weight-average molecular weight [Mw] to a number-average molecular weight [Mn] from 2 to 10 and a haze of 50% or below, and 0–30% by weight of polypropylene;
   wherein the layers on each surface of the base layer consist essentially of polyethylene or of polypropylene, and have a melt index [MI] of 0.1 to 30 g/10 min. and a haze up to that of the base layer;
   and wherein the laminate has a haze of 3% or less, a strain recovery rate of 90% or more, and a ratio of tear strength in the machine direction to tear strength in the transverse direction of from 0.25 to 4.

2. A polyolefin resin laminate according to claim 1, wherein the α-olefin is ethylene.

3. A polyolefin resin laminate according to claim 2, wherein the highest melting point of the butene-1-ethylene copolymer measured by differential scanning calorimetric analysis is 70–120° C. and the difference between the highest melting point and the lowest melting point is 2–40° C.

4. A polyolefin resin according to claim 2, wherein the heat of fusion of the butene-1-ethylene copolymer measured by differential scanning calorimetric analysis is 2–25 cal/g.

5. A polyolefin resin according to claim 2, wherein the ethylene block property in the butene-1-ethylene copolymer measured by $^{13}$C-NMR is 0.015 or less.

6. A polyolefin resin laminate according to claim 2, wherein the diethyl ether soluble content of the butene-1-ethylene copolymer is 3–25 wt %.

7. A polyolefin resin laminate according to claim 1 wherein the polyethylene is a linear low-density polyethylene.

8. A polyolefin resin laminate according to claim 1, wherein the thickness of the base layer is 7-45 μm.

9. A polyolefin resin laminate according to claim 1, wherein the ratio of the thickness of the base layer to the layers located on the opposite surfaces of the base layer is 0.5-20.

* * * * *